United States Patent
Takezawa

(10) Patent No.: US 6,722,768 B1
(45) Date of Patent: Apr. 20, 2004

(54) PROJECTOR

(75) Inventor: Takeshi Takezawa, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/679,296

(22) Filed: Oct. 6, 2000

(30) Foreign Application Priority Data

Oct. 6, 1999 (JP) ............................................ 11-285407

(51) Int. Cl.$^7$ ........................ G03B 21/14; G03B 21/26; G03B 21/00; G02F 1/1335; G02F 1/13

(52) U.S. Cl. ........................... 353/20; 353/33; 353/34; 353/37; 353/38; 349/9; 349/18; 349/193

(58) Field of Search ............................ 353/20, 31, 34, 353/33, 37, 38; 349/5, 8, 9, 18, 193

(56) References Cited

U.S. PATENT DOCUMENTS

| | | | |
|---|---|---|---|
| 5,283,600 A | * 2/1994 | Imai | 353/34 |
| 5,311,340 A | 5/1994 | Murata et al. | 349/119 |
| 5,576,854 A | * 11/1996 | Schmidt et al. | 359/5 |
| 5,583,679 A | 12/1996 | Ito et al. | 349/118 |
| 5,844,649 A | 12/1998 | Yamahara et al. | 349/118 |
| 5,978,054 A | * 11/1999 | Fujimori | 349/60 |
| 6,092,901 A | 7/2000 | Hashizume et al. | 362/19 |
| 6,152,566 A | * 11/2000 | Hashizume | 353/20 |
| 6,330,108 B1 | * 12/2001 | Nishikouji et al. | 359/499 |

FOREIGN PATENT DOCUMENTS

| | | |
|---|---|---|
| JP | 1-277282 | 11/1989 |
| JP | 2-269312 | 11/1990 |
| JP | 3-6519 | 1/1991 |
| JP | A 6-11710 | 1/1994 |
| JP | A 6-167691 | 6/1994 |
| JP | 8-50206 | 2/1996 |
| JP | 9-127331 | 5/1997 |
| JP | 9-230141 | 9/1997 |
| JP | A 9-258201 | 10/1997 |
| JP | 2-287317 | 11/1997 |
| JP | A 10-3081 | 1/1998 |
| JP | 10-54982 | 2/1998 |
| JP | 10-62779 | 3/1998 |
| JP | A 10-206635 | 8/1998 |
| JP | 11-183848 | 7/1999 |
| JP | 11-212078 | 8/1999 |
| JP | 11-244764 | 9/1999 |

* cited by examiner

Primary Examiner—Russell Adams
Assistant Examiner—Magda Cruz
(74) Attorney, Agent, or Firm—Oliff & Berridge, PLC

(57) ABSTRACT

A technique capable of increasing contrast of a projected and displayed image of a projector. A projector includes an illuminating system that emits illumination light, a liquid crystal light valve for modulating light from the illuminating system according to image information, and a projection system for projecting image light formed on a light emission surface of the liquid crystal light valve. A liquid crystal light valve includes a liquid crystal panel, first and second polarizers disposed on the side of the light incidence surface and on the side of the light emission surface of the liquid crystal panel, and first and second compensating plates disposed between the liquid crystal panel and the first and second polarizers, respectively. By using such a liquid crystal light valve, incidence angle dependency of contrast of image light formed on the light emission surface of the liquid crystal light valve is reduced, whereby it is possible to increase contrast of an image projected and displayed by the projection system.

44 Claims, 7 Drawing Sheets

PROJECTOR

BACKGROUND OF THE INVENTION

1. Field of Invention

The present invention relates to a projector for projecting and displaying an image with the use of a liquid crystal panel.

2. Description of Related Art

In a projector using a liquid crystal panel, light emitted from an illuminating system is modulated according to image information (image signals) with the use of a liquid crystal light valve including a liquid crystal panel, and the modulated image light (light representing an image) is projected onto a screen with the use of a projection lens, thereby achieving image display.

The liquid crystal light valve has the property of changing contrast according to an incidence angle of light. Therefore, in a conventional projector, the contrast of an image projected onto the screen is totally decreased according to an angle of incident light (hereinafter, this phenomenon is referred to as "incidence angle dependency of contrast"). When the incidence angle of light is in one direction, this phenomenon may be resolved by adjusting the incidence angle of light to a direction in which contrast becomes highest. However, it is almost impossible to obtain light in one direction from a light source device, and various optical elements, such as lenses or mirrors, are disposed between the light source device and the liquid crystal light valve in the projector. Therefore, it is very difficult to adjust the angle of light incident on the liquid crystal light valve in one direction. In addition, in a recent projector, a so-called integrator system is used in order to apply light having a uniform illumination distribution onto the liquid crystal light valve. Since this integrator system is an optical system which divides a light emitted from a light source device into a plurality of partial light to form a plurality of spatially separated pseudo light sources, and superimposes the light sources on a light incidence surface of the liquid crystal light valve to thereby illuminate the light valves, light is applied onto the liquid crystal light valve from various directions. In general, illuminance of illumination light is uniformly distributed as the number of pseudo light source images is increased. However, the more the number of the pseudo light source images is increased, the more the number of directions of light incident on the liquid crystal light valve is increased. Therefore, according to the projector using the integrator system, it is particularly difficult to increase the contrast of the overall projection screen.

This invention is made to solve the above-described problems in the conventional art, and an object is to provide a technique capable of increasing contrast of a projected and displayed image in a projector.

SUMMARY OF THE INVENTION

In order to solve at least a part of the above-described problems, according to a first apparatus of the present invention, there is provided a projector including:

an illuminating system that emits illumination light;

a liquid crystal light valve that modulates light from the illuminating system according to image information; and a projection system that projects image light formed on a light emission surface of the liquid crystal light valve;

wherein the liquid crystal light valve includes:

a liquid crystal panel;

a first polarizer disposed on the side of the light incidence surface of the liquid crystal panel;

a second polarizer disposed on the side of the light emission surface of the liquid crystal panel;

a first compensating plate disposed between the liquid crystal panel and the first polarizer; and a second optical compensating plate disposed between the liquid crystal panel and the second polarizer.

In the projector of the present invention, the liquid crystal light valve includes a compensating plate on the side of the light incidence surface and on the side of the light emission surface of the liquid crystal panel. This will reduce the aforementioned incidence angle dependency of contrast, whereby it is possible to increase contrast of an image projected and displayed by the projection system.

According to a second apparatus of the present invention, there is provided a projector that projects and displays a color image, including:

an illuminating system that emits illumination light;

a color separation system that separates the illumination light emitted from the illumination system into first to third color lights having three color components;

first to third liquid crystal light valves that modulate first to third color lights separated by the color separation system according to image information;

a color synthesizing section that synthesizes image lights formed on light emission surfaces of the first to third liquid crystal valves; and a projection system that projects synthesized light emitted from the color synthesizing section;

wherein each of the first to third liquid crystal light valves includes:

a liquid crystal panel;

a first polarizer disposed on the side of the light incidence surface of the liquid crystal panel;

a second polarizer disposed on the side of the light emission surface of the liquid crystal panel;

a first compensating plate disposed between the liquid crystal panel and the first polarizer; and a second compensating plate disposed between the liquid crystal panel and the second polarizer.

In the second projector, incidence angle dependency of contrast can also be reduced in the same manner as the first projector, so that the contrast of a color image projected and displayed by the projection system can be increased.

According to a third apparatus of the present invention, there is provided a projector, including:

an illuminating system that emits illumination light;

a liquid crystal light valve that modulates light from the illuminating system according to image information; and a projection system that projects image light formed on a light emission surface of the liquid crystal light valve;

wherein the liquid crystal light valve includes:

a liquid crystal panel;

a first polarizer disposed on the side of the light incidence surface of the liquid crystal panel;

a second polarizer disposed on the side of the light emission surface of the liquid crystal panel; and a first and a second compensating plates disposed between the liquid crystal panel and the first polarizer or between the liquid crystal panel and the second polarizer.

In the third projector, a first and a second compensating plate are disposed between the liquid crystal panel and the first polarizer or between the liquid crystal panel and the second polarizer. This will reduce the aforementioned incidence angle dependency of contrast in the same manner as the first projector, so that the contrast of an image projected and displayed by the projection system can be increased.

According to a fourth apparatus of the present invention, there is provided a projector that projects and displays a color image, including:

an illuminating system that emits illumination light;

a color separation system that separates the illumination light emitted from the illumination system into first to third color lights having three color components;

first to third liquid crystal light valves that modulate first to third color lights separated by the color separation system according to image information;

a color synthesizing section that synthesizes image lights formed on light emission surfaces of the first to third liquid crystal valves; and a projection system that projects synthesized light emitted from the color synthesizing section;

wherein each of the first to third liquid crystal light valves includes:

a liquid crystal panel;

a first polarizer disposed on the side of the light incidence surface of the liquid crystal panel;

a second polarizer disposed on the side of the light emission surface of the liquid crystal panel; and a first and a second compensating plate disposed between the liquid crystal panel and the first polarizer or between the liquid crystal panel and the second polarizer.

In the second projector, incidence angle dependency of contrast can also be reduced in the same manner as the third projector, so that the contrast of a color image projected and displayed by the projection system can be increased.

In the above-described projector, the illuminating system may include:

a light source device that emits a nearly parallel light;

a light dividing element that divides the light emitted from the light source device into a plurality of partial light; and a superimposing lens that superimposes and illuminates the plurality of partial light emitted from the light dividing element on the light incidence surface of the liquid crystal light valve.

A so-called integrator system which divides a light emitted from the light source device into a plurality of partial light, and superimposes the partial light on the light incidence surface of the liquid crystal light valve is an optical system for applying light from a plurality of pseudo light sources to the light valve, so that light will be applied to the liquid crystal light valve from plural directions. Since the first and second compensating plates are used in the projector of the present invention, incidence angle dependency of contrast can be reduced even if light enters the liquid crystal light valve from plural directions as described above. Consequently, it is possible to increase contrast of the image projected and displayed by the projection system. When the integrator system is used, light enters from various directions, and contrast cannot be increased by a conventional method such that the incidence angle of light is adjusted to a direction in which contrast becomes highest, so that the use of the present invention is particularly highly effective.

In the above-described projector, the liquid crystal panel may be in a TN mode.

When a liquid crystal panel in the TN mode is utilized as the liquid crystal light valve, contrast tends to have incidence angle dependency. Therefore, the present invention is particularly highly effective when the liquid crystal panel in the TN mode is used.

In the above-described projector, the compensating plate preferably includes a polymer layer in which the angle of inclination of an optical axis varies in the direction of the thickness.

A liquid crystal layer of the liquid crystal light valve takes a complicated structure in which the inclination of liquid crystal molecules varies in the direction of the thickness when the ON-drive voltage is applied thereto. Unless the inclination of the liquid crystal molecules is constant, light enters each of the liquid crystal molecules from different directions. This means that leakage of light occurs in black display when a liquid crystal light valve in a normally white mode, that represents black in a state of application of the ON-drive voltage, is used. According to the compensating plate including a polymer layer in which the angle of the optical axis is uniformly inclined, the complicated inclination of the liquid crystal molecules cannot be completely compensated, and there is a possibility that increasing effects of contrast is reduced. On the other hand, if the compensating plate including a polymer layer in which the angle of inclination of the optical axis varies in the direction of the thickness is used, it is possible to compensate the influence of complicated inclination of the liquid crystal molecules, whereby good contrast can be obtained.

The above-described projector may further include a circuit board for supplying signals to the liquid crystal panel.

The above-described projector may further include a power source for supplying electric power to the liquid crystal panel.

DETAILED DESCRIPTION OF PREFERRED EMBODIMENTS

Figure 1:
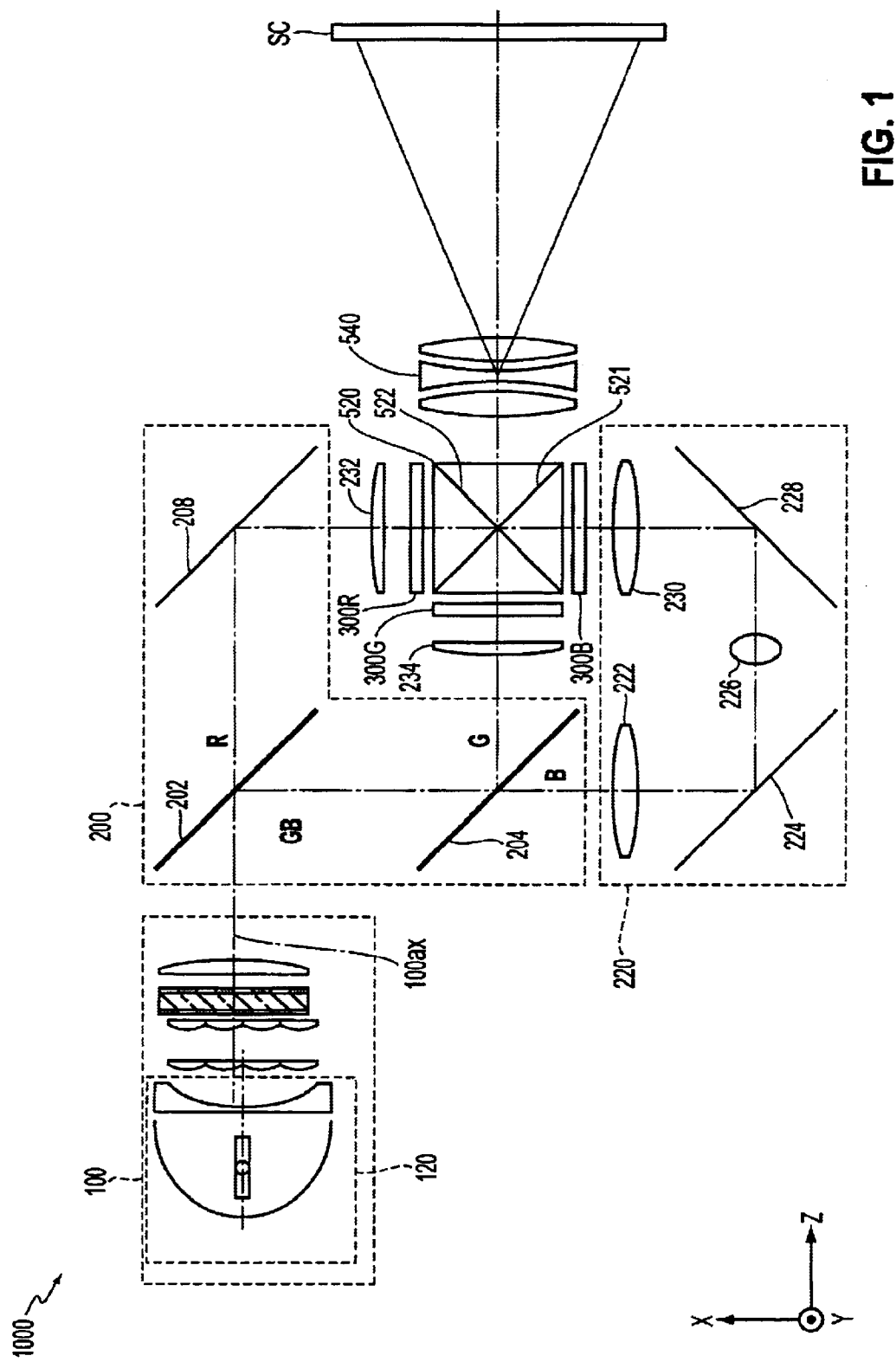
FIG. 1 is an illustration showing a projector to which the present invention is applied.

Next, a mode for carrying out the present invention will be described based on an embodiment. FIG. 1 is an illustration showing a projector to which the present invention is applied. A projector 1000 includes an illuminating system 100 containing a light source device 120, a color separation system 200, a relay system 220, three liquid crystal light valves 300R, 300G, and 300B, a crossed dichroic prism 520, and a projection lens 540.

Light emitted from the illuminating system 100 is separated by the color separation system 200 into light of the three colors red (R), green (G), and blue (B). Each separated color light is modulated by the liquid crystal light valves 300R, 300G, and 300B according to image information. Each modulated color light is synthesized by the crossed dichroic prism 520, whereby a color image is projected and displayed onto a screen SC by the projection lens 540.

Figure 2:
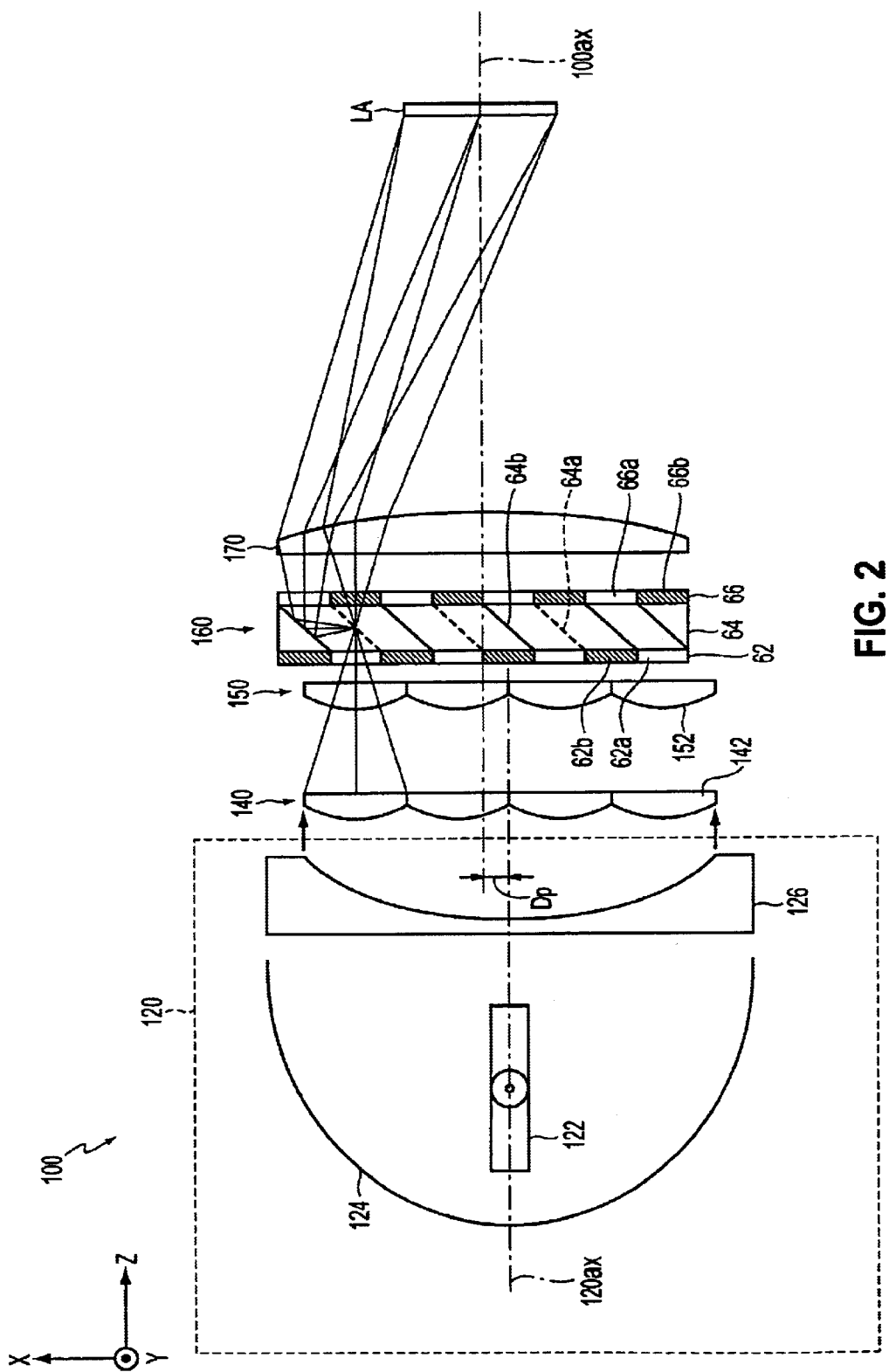
FIG. 2 is an enlarged illustration showing an illuminating system 100 in FIG. 1.

FIG. 2 is an enlarged illustration showing the illuminating system 100 in FIG. 1. The illuminating system 100 includes a light source device 120, first and second lens arrays 140 and 150, a polarized-light generating system 160, and a superimposing lens 170. The light source device 120 and the first and second lens arrays 140 and 150 are disposed with reference to a light source optical axis 120ax, and the polarized-light generating system 160 and the superimposing lens 170 are disposed with reference to a system optical axis 100ax. The light source optical axis 120ax is a central axis of a light emitted from the light source device 120, and the system optical axis 100ax is a central axis of a light emitted from optical elements subsequent to the polarized-light generating system 160. As shown in the figure, the system optical axis 100ax deviates from the light source optical axis 120ax substantially in parallel thereto by a predetermined amount of deviation Dp in the x direction. The amount of deviation Dp will be described later. In FIG. 2, an illumination area LA illuminated by the illuminating system 100 corresponds to the liquid crystal light valves 300R, 300G, and 300B in FIG. 1.

The light source device 120 has the function of emitting a nearly parallel light. The light source device 120 includes a light source lamp 122, a reflector 124 having a concave surface in the shape of an ellipsoidal surface of revolution, and a collimator lens 126. Light emitted from the light source lamp 122 is reflected by the reflector 124, and the reflected light is converted by the collimator lens 126 into light nearly parallel to the light source optical axis 120ax. A reflector having a concave surface in the shape of a paraboloidal surface of revolution may be used as the light source device.

The first lens array 140 has a plurality of small lenses 142 arranged in a matrix. Each of the small lenses 142 is a plane-convex lens, and the external shape as viewed from the z direction is set to be substantially similar to the shape of the illumination area LA (liquid crystal light valve). The first lens array 140 divides the nearly parallel light emitted from the light source device 120 into a plurality of partial light, and emits the light. The first lens array 140 is equivalent to a light dividing element of the present invention.

The second lens array 150 has a plurality of small lenses 152 arranged in a matrix, and a lens array similar to the first lens array 140 is used. The second lens array 150 has the function of adjusting central axes of partial light emitted from the first lens array 140 so as to be nearly parallel to the system optical axis 100ax, and has the function of forming images of the small lenses 142 of the first lens array 140 on the illumination area LA. The second lens array 150 can be omitted.

The partial light emitted from the small lenses 142 of the first lens array 140 are condensed at positions near the second lens array 150, that is, in the polarized-light generating system 160, via the second lens array 150.

Figure 3A:
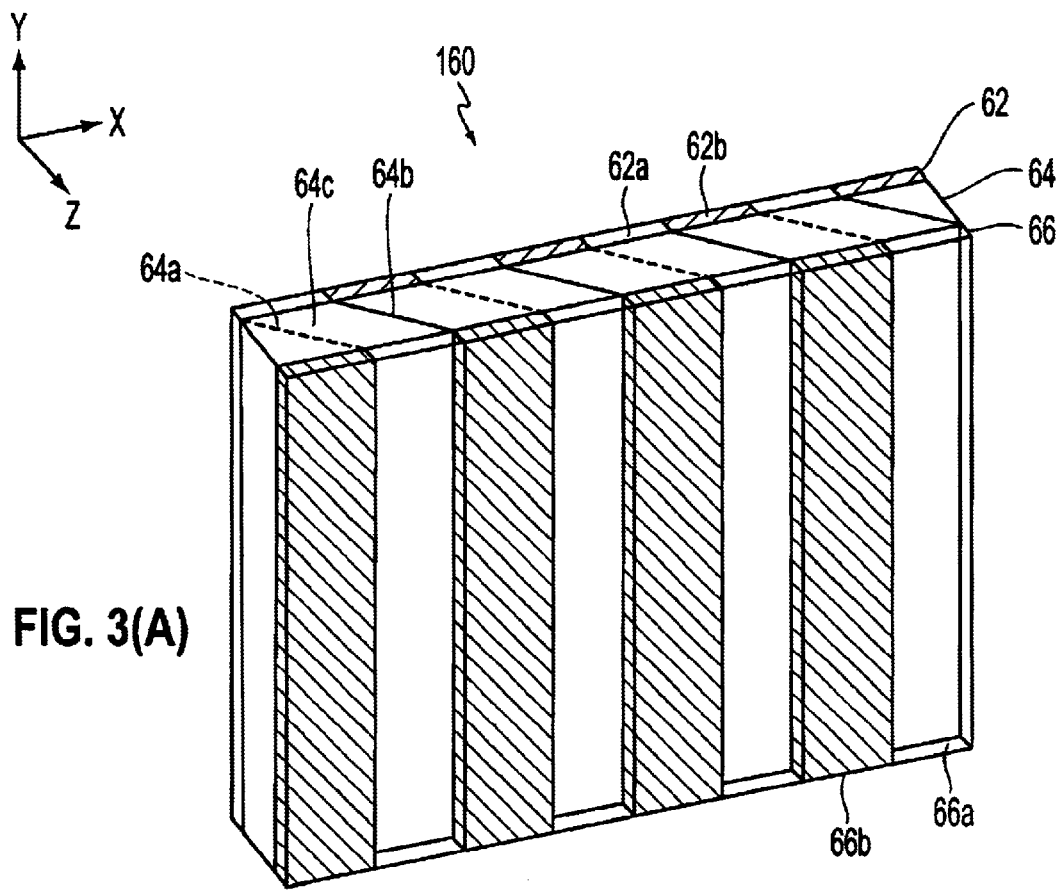
FIG. 3 includes illustrations each showing a polarized-light generating system 160.
Figure 3B:
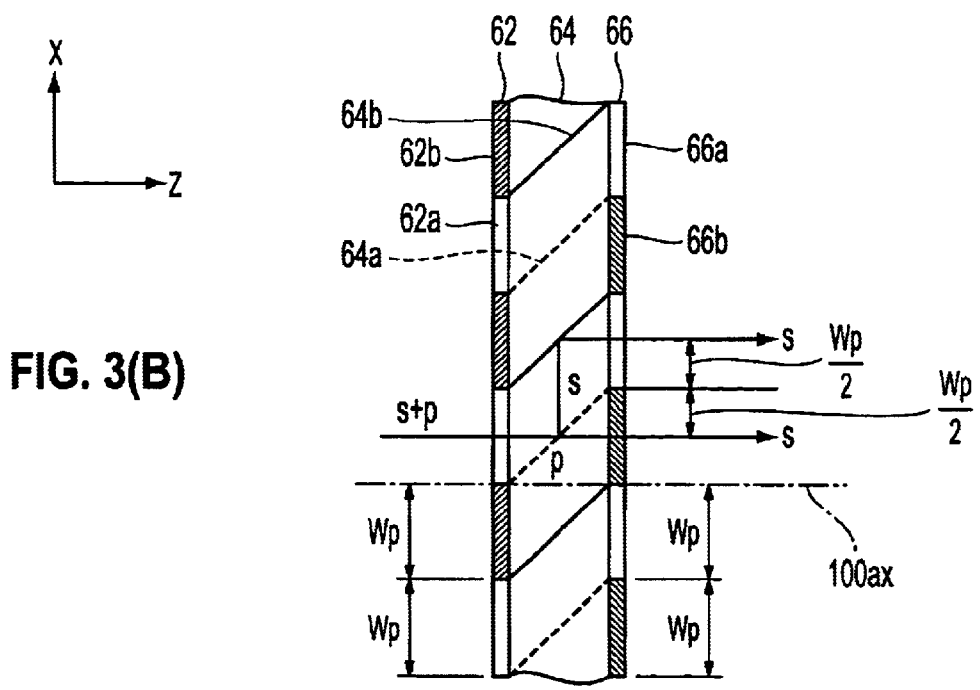

FIG. 3 includes illustrations each showing the polarized-light generating system 160. FIG. 3(A) is a perspective view of the polarized-light generating system 160, and FIG. 3(B) shows a part of a plan view as viewed from the +y direction.

The polarized-light generating system 160 includes a light-shielding plate 62, a polarization beam splitter array 64, and a selective phase film 66.

The polarization beam splitter array 64 is, as shown in FIG. 3(A), formed by bonding a plurality of columnar light-transmissive plate members 64c each having the shape of nearly a parallelogram in cross section.

Polarization beam separation films 64a and reflecting films 64b are formed alternately on the interfaces of the light-transmissive plate members 64c. Dielectric multilayer films are used as the polarization beam separation films 64a, and dielectric multilayer films or metallic films are used as the reflecting films 64b.

The light-shielding plate 62 is composed of light-shielding surfaces 62b and opening surfaces 62a arranged in the shape of stripes. The light-shielding plate 62 has the function of intercepting a light incident on the light-shielding surfaces 62b, and of passing therethrough a light incident on the opening surfaces 62a. The light-shielding surfaces 62b and the opening surfaces 62a are arranged so that the partial light emitted from the first lens array 140 (FIG. 2) enter only the polarization beam separation films 64a of the polarization beam splitter array 64 and do not enter the reflecting films 64b. More specifically, as shown in FIG. 3(B), the light-shielding surfaces 62b and the opening surfaces 62a are disposed so that the center of each opening surface 62a of the light-shielding plate 62 substantially coincides with the center of each polarization beam separation film 64a of the polarization beam splitter array 64. In addition, the width Wp of each opening surface 62a in the x direction is set to be substantially equal to the size of the polarization beam separation film 64a in the x direction. In this case, almost all of the light passing through the opening surfaces 62a of the light-shielding plate 62 enter only the polarization beam separation films 64a and do not enter the reflecting films 64b. A plate-like transparent member (such as a glass plate) having a light-shielding film (such as a chromium film, an aluminum film, or a dielectric multilayer film) partially formed thereon can be used as the light-shielding plate 62. In addition, a light-shielding plate, such as an aluminum plate, provided with an opening may be used.

Each of the partial light emitted from the first lens array 140 (FIG. 2) enters the opening surfaces 62a of the light-shielding plate 62 with the main light beam (central axis) thereof substantially in parallel to the system optical axis 100ax, as shown by the solid line in FIG. 3(B). The partial light passing through the opening surface 62a enters the polarization beam separation film 64a. The polarization beam separation film 64a separates the incident partial light into a partial light of s-polarized light and a partial light of p-polarized light. In this case, the partial light of p-polarized light passes through the polarization beam separation film 64a, and the partial light of s-polarized light is reflected by the polarization beam separation film 64a. The partial light of s-polarized light reflected by the polarization beam separation film 64a travels toward the reflecting film 64b, where it is further reflected. In this case, the partial light of p-polarized light passing through the polarization beam separation film 64a and the partial light of s-polarized light reflected by the reflecting film 64b are nearly in parallel to each other.

The selective phase film 66 is composed of opening layers 66a and λ/2 phase layers 66b. The opening layers 66a are portions where the λ/2 phase layers 66b are not formed. Each opening layer 66a has the function of transmitting an incident linear polarized light beam unchanged. On the other hand, each λ/2 phase layer 66b functions as a polarization conversion element for converting the incident linear polarized light beam into a linear polarized light beam polarized in a direction perpendicular thereto. In this embodiment, as shown in FIG. 3(B), the partial light of p-polarized light transmitted by the polarization beam separation film 64a enters the λ/2 phase layer 66b. Therefore, the partial light of p-polarized light is emitted while being converted into a partial light of s-polarized light by the λ/2 phase layer 66b. On the other hand, since the partial light of s-polarized light reflected by the reflecting film 64b enters the opening layer 66a, it is emitted unchanged as the partial light of s-polarized light. That is, an unpolarized partial light incident on the polarized-light generating system 160 is emitted while being converted into a partial light of s-polarized light. Incidentally, by disposing the λ/2 phase layer 66b only on the emission surface of the partial light of s-polarized light reflected by the reflecting film 64b, the partial light incident on the polarized-light generating system 160 can be emitted while being converted into a partial light of p-polarized light.

As the selective phase film 66, a phase film may be used in which no member is provided on the portion of the opening layers 66a, and the λ/2 phase layers 66b are merely bonded on the emission surfaces of the partial light of p-polarized light or the partial light of s-polarized light.

As will be understood from FIG. 3(B), the centers of two s-polarized light beams emitted from the polarized-light generating system 160 deviate from the center of incident unpolarized light (s-polarized light beam and p-polarized light beam) in the +x direction. The amount of deviation is equal to half of the width Wp (that is, the size of the polarization beam separation film 64a in the x direction) of the λ/2 phase layer 66b. For this reason, as shown in FIG. 2, the light source optical axis 120ax deviates from the system optical axis 100ax by a distance Dp that is equal to Wp/2.

As described above, a plurality of partial light emitted from the first lens array 140 are separated into two partial light by the polarized-light generating system 160 for each of the partial light, and are converted into one type of linear polarized light beams that are polarized in substantially the same direction. The plurality of partial light polarized in the same direction is superimposed on the illumination area LA by the superimposing lens 170 shown in FIG. 2. In this case, an intensity distribution of light applied to the illumination area LA is substantially uniform.

The illuminating system 100 (FIG. 1) emits illumination light (s-polarized light) polarized in the same direction, and illuminates the liquid crystal light valves 300R, 300G, and 300B via the color separation system 200 and the relay system 220.

The color separation system 200 includes two dichroic mirrors 202 and 204, and a reflecting mirror 208, and has the function of separating a light emitted from the illuminating system 100 into color light of three colors, red, green, and blue. The first dichroic mirror 202 transmits a red light component of the light emitted from the illuminating system 100, and reflects a blue light component and a green light component. The red light R transmitted by the first dichroic mirror 202 is reflected by the reflecting mirror 208, and is emitted toward the crossed dichroic prism 520. The red light R emitted from the color separation system 200 passes through a field lens 232 to reach the liquid crystal light valve 300R for the red light. This field lens 232 has the function of converting each of the partial light emitted from the illuminating system 100 into a light parallel to the central axis thereof. This also applies to field lenses 234 and 230 provided on the side of light incidence surfaces of other liquid crystal light valves 300G and 300B.

Of the blue light B and the green light G reflected by the first dichroic mirror 202, the green light G is reflected by the second dichroic mirror 204, and is emitted from the color separation system 200 toward the crossed dichroic prism 520. The green light G emitted from the color separation system 200 passes through the field lens 234 to reach the liquid crystal light valve 300G for the green light. On the other hand, the blue light B transmitted by the second dichroic mirror 204 is emitted from the color separation system 200, and enters the relay system 220.

The blue light B incident on the relay system 220 passes through an incidence-side lens 222, a relay lens 226, reflecting mirrors 224 and 228, and an emission-side lens (field lens) 230 included in the relay system 220 to reach the liquid crystal light valve 300B for the blue light. The relay system 220 is used for the blue light B because the length of the optical path of the blue light B is longer than the length of the optical paths of other color lights R and G, and the use of the relay system 220 transmit the blue light B incident on the incidence-side lens 222 unchanged to the emission-side lens 230.

The three liquid crystal light valves 300R, 300G, and 300B modulate incident light of three colors according to given image information (image signals) to produce modulated light.

The crossed dichroic prism 520 synthesizes the light of three colors (modulated light) modulated via the liquid crystal light valves 300R, 300G, to form synthesized light representing a color image. The crossed dichroic prism 520 has red light-reflecting films 521 and blue light-reflecting films 522 formed in substantially an X shape on the interfaces of four rectangular prisms. The red light-reflecting films 521 are formed of dielectric multilayer films for reflecting the red light, and the blue light-reflecting films 522 are formed of dielectric multilayer films for reflecting the blue light. The light of three colors are synthesized by the red light-reflecting films 521 and the blue light-reflecting films 522, whereby synthesized light representing the color image is produced.

Synthesized light produced by the crossed dichroic prism 520 is emitted toward the projection lens 540. The projection lens 540 projects the synthesized light emitted from the crossed dichroic prism 520, and displays a color image on the screen SC. A telecentric lens may be used as the projection lens 540.

Figure 4:
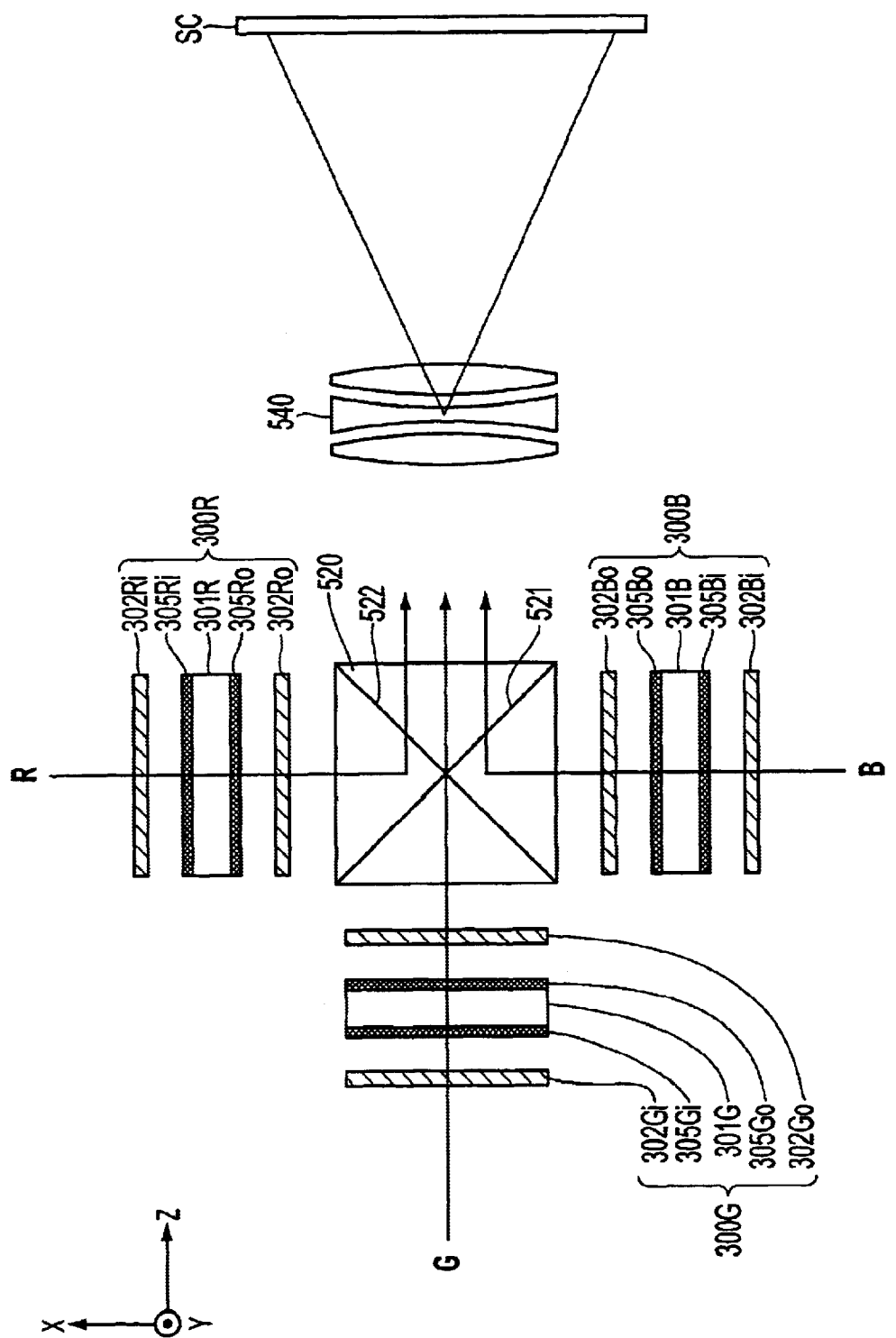
FIG. 4 is an enlarged illustration showing three liquid crystal light valves 300R, 300G, and 300B in FIG. 1.

FIG. 4 is an enlarged illustration showing the three liquid crystal light valves 300R, 300G, and 300B in FIG. 1. As aforementioned, the color lights R, G, and B enter the first to third liquid crystal light valves 300R, 300G, and 300B, respectively. The modulated light of the color light R emitted from the first liquid crystal light valve 300R is reflected by the red light-reflecting film 521 of the crossed dichroic prism 520, and the modulated light of the color light B emitted from the third liquid crystal light valve 300B is reflected by the blue light-reflecting film 522. On the other hand, the modulated light of the color light G emitted from the second liquid crystal light valve 300G is transmitted by the two reflecting films 521 and 522 of the crossed dichroic prism 520. In this way, three modulated light are synthesized, and a color image is displayed on the screen SC by the projection lens 540. In FIG. 4, for the convenience of the figure, positions where the red light and the blue light are reflected are shown at the positions deviating from the two reflecting films 521 and 522.

The first liquid crystal light valve 300R includes a liquid crystal panel 301R, first and second polarizers 302R$i$ and 302R$o$ disposed on the side of the light incidence surface and on the side of the light emission surface of the liquid crystal panel, and first and second compensating films 305R$i$ and 305R$o$ disposed between the liquid crystal panel and the first and second polarizers, respectively.

While the first and second compensating films 305R$i$ and 305R$o$ are bonded to the liquid crystal panel 301R in FIG. 4, they may be bonded to the first and second polarizers 302R$i$ and 302R$o$, respectively. When cooling efficiency of the compensating films 305R$i$ and 305R$o$ is considered, however, the first and second compensating films 305R$i$ and 305R$o$ may preferably be provided apart from the liquid crystal panel 301R and the polarizers 302R$i$ and 302R$o$. In this case, the compensating films 305R$i$ and 305R$o$ may be bonded to light-transmissive plate members, such as thin plate grass, respectively.

The first polarizer 302R$i$ that is provided on the side of the light incident surface of the liquid crystal light valve 300R has the function of increasing the degree of polarization of a linear polarized light beam emitted from the polarized-light generating system 160. The liquid crystal panel 301R is a modulation device for modulating the incident light according to image signals, and receives power supply from an electric power source (not shown). Signals from a driving power source or from the outside are supplied via a circuit board (not shown). In this embodiment, a liquid crystal device in a TN (Twisted Nematic) mode is used as the liquid crystal panel. The second polarizer 302R$o$ on the side of the light emission surface of the liquid crystal light valve 300R is provided in such a manner that the polarization axis thereof perpendicularly intersects the polarization axis of the first polarizer 302R$i$, and transmits only a light component coinciding with the direction of the polarization axis of the second polarizer in the light modulated by the liquid crystal panel 301R. This allows a red image light to be formed on the light emission surface of the liquid crystal light valve 300R.

In the liquid crystal light valve 300R of this embodiment, the first and the second compensating films 305R$i$ and 305R$o$ are formed on the side of the light incident surface and on the side of the light emission surface of the liquid crystal panel 301R. This is for the purpose of reducing the incidence angle dependency of contrast. The compensating films 305R$i$ and 305R$o$ will be further described later.

The second and third liquid crystal light valves 300G and 300B are configured in a manner similar to that of the first liquid crystal light valve 300R. For example, the second liquid crystal light valve 300G includes first and second polarizers 302G$i$ and 302G$o$, first and second compensating films 305G$i$ and 305G$o$, and a liquid crystal panel 301G. The third liquid crystal light valve 300B includes first and second polarizers 302B$o$ and 302B$i$, first and second compensating films 305B$o$ and 305B$i$, and a liquid crystal panel 301B.

Figure 5:
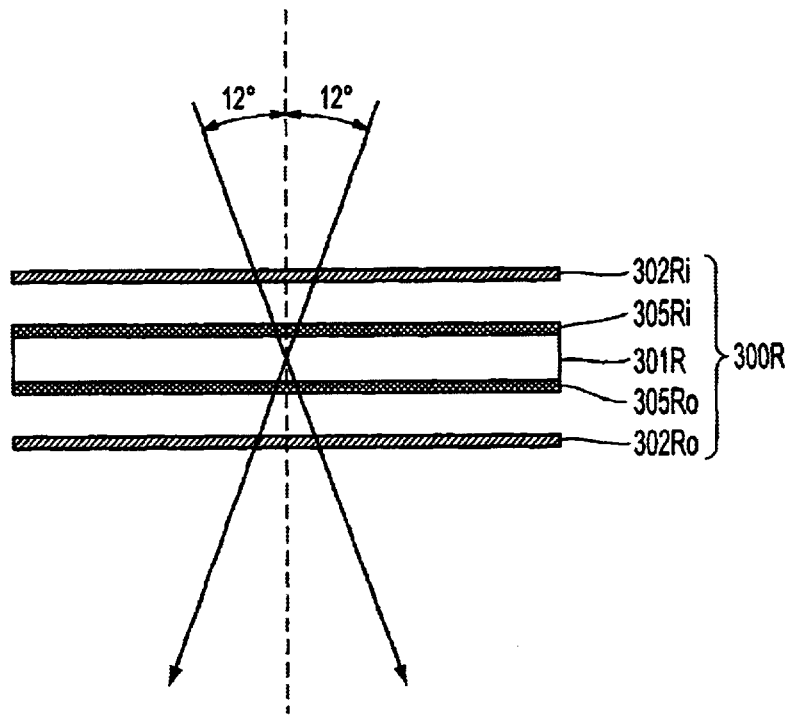
FIG. 5 is an illustration showing a state of light entering a first liquid crystal light valve 300R.

FIG. 5 is an illustration showing a state of light entering the first liquid crystal light valve 300R. As shown in the figure, in the projector of this embodiment, light enters the liquid crystal light valve 300R from various directions even on one point thereof. In this embodiment, light inclined at most about 12° relative to a direction of normal line enters the liquid crystal light valve 300R. This is because a so-called integrator system is used as the illuminating system 100 in the projector (FIG. 1) of this embodiment. As described in FIG. 2, the illuminating system 100 of this embodiment includes the light source device 120 for emitting a nearly parallel light, the lens array 140 for dividing the light emitted from the light source device 120 into a plurality of partial light, and the superimposing lens 170 for superimposing and applying the plurality of partial light emitted from the lens array 140 on the light incidence surface of the liquid crystal light valve 300R. When such an integrator system is used as the illuminating system, as shown in FIG. 2, a plurality of pseudo light sources are formed by the plurality of once-divided partial light, and light applied from various pseudo light sources is superimposed on the liquid crystal light valve 300R. Therefore, light enters the liquid crystal valve 300R from various directions even on the one point thereof.

In the liquid crystal light valve, the polarization state of light entering in an oblique direction is changed by alignment state of liquid crystal molecules. More specifically, a linear polarized light beam obliquely entering into the liquid crystal panel is turned into an elliptic polarized light beam and is emitted due to the anisotropy of reflective index (birefringence) of liquid crystal. The elliptic polarized light beam is elliptic polarized light in which the principal axes (major axis and minor axis) of an ellipse vary according to a direction of incidence of light, that is, elliptic polarized light that is anisotropic due to the incidence angle. In this case, in a conventional liquid crystal light valve including no compensating film, light that should be emitted from a second polarizer disposed on the side of the light emission surface will not be emitted well. This is because the second polarizer emits only a light component coinciding with the direction of the polarization axis of the second polarizer in the elliptic polarized light beam emitted from a liquid crystal panel. More specifically, light that should not be emitted is emitted from the second polarizer in the same direction as the direction of incidence of light (direction of travel), or only a part of light that should be emitted is emitted. If an image light representing a monochrome image is observed from a direction of travel of light, black display approaches white display and the image is observed as a bright black image when the light that should not be emitted is emitted, and the white display approaches the black display and the image is observed as a dark white image when only a part of the light that should be emitted is emitted. In this way, incidence angle dependency of contrast appears such that contrast of the image light changes according to the incidence angle of light.

The first and second compensating films 305R$i$ and 305R$o$ are compensating films having optical characteristics contrary to the characteristics of such a liquid crystal panel, that is, optical characteristics of canceling the influence of the anisotropy of reflective index (birefringence) of the liquid crystal panel. In this embodiment, a liquid crystal film including a polymer layer in which an angle of inclination of an optical axis varies in the direction of the thickness is used as the compensating films 305R$i$ and 305R$o$. As such a film, for example, "Fuji WV Film Wide View A" marketed by Fuji Photo Film Co., Ltd. may be used.

Figure 8:
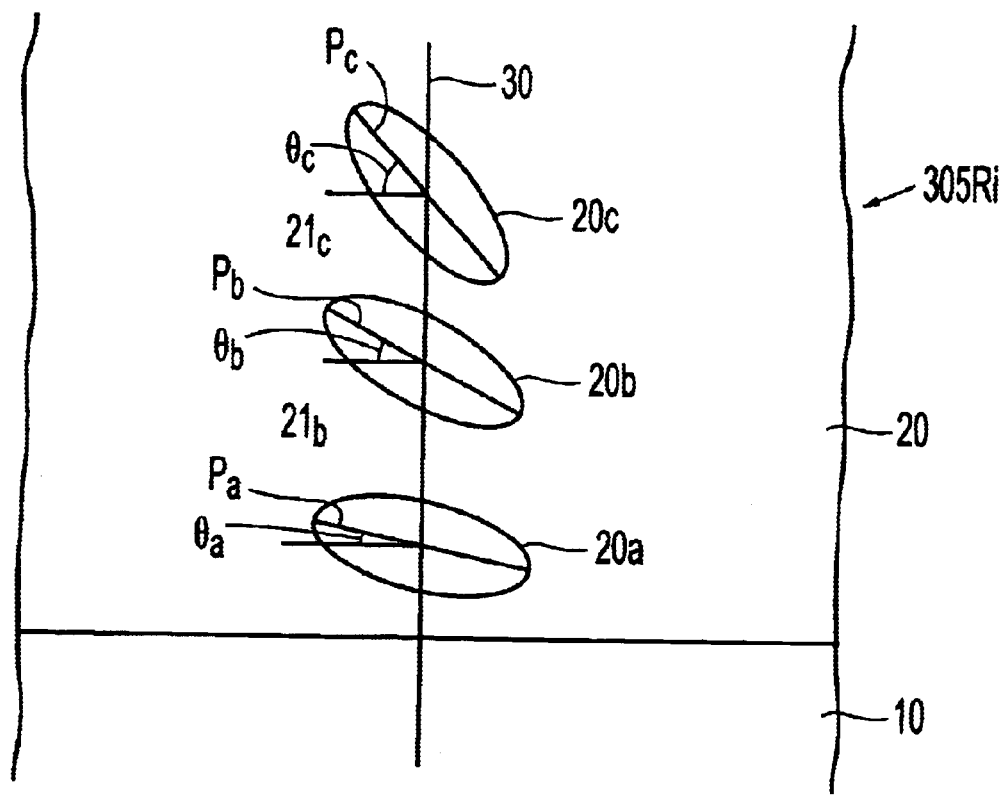
FIG. 8 shows the angle of inclination of an optical axis varying in a direction of the thickness of a compensating plate.

FIG. 8 shows a compensating film 305R$i$ according to an embodiment of the invention. The compensating film 305R$i$ includes a substrate 10 and an optically anisotropic layer 20 arranged on the substrate 10. Discotic liquid crystalline compounds 20$a$, 20$b$ and 20$c$ constitute the optically anisotropic layer 20. The discotic liquid crystalline compounds 20$a$, 20$b$ and 20$c$ are arranged on the substrate 10 in such a manner that the planes of discotic structure units Pa, Pb and Pc are inclined from planes 21a, 21b and 21c which are parallel to a plane of the substrate 10 and the inclined angles θa, θb and θc increase, in order, with increase of distance in a direction of depth (thickness) from a bottom of the optically anisotropic layer 20. The reference number 30 is the normal of the substrate 10.

Figure 6:
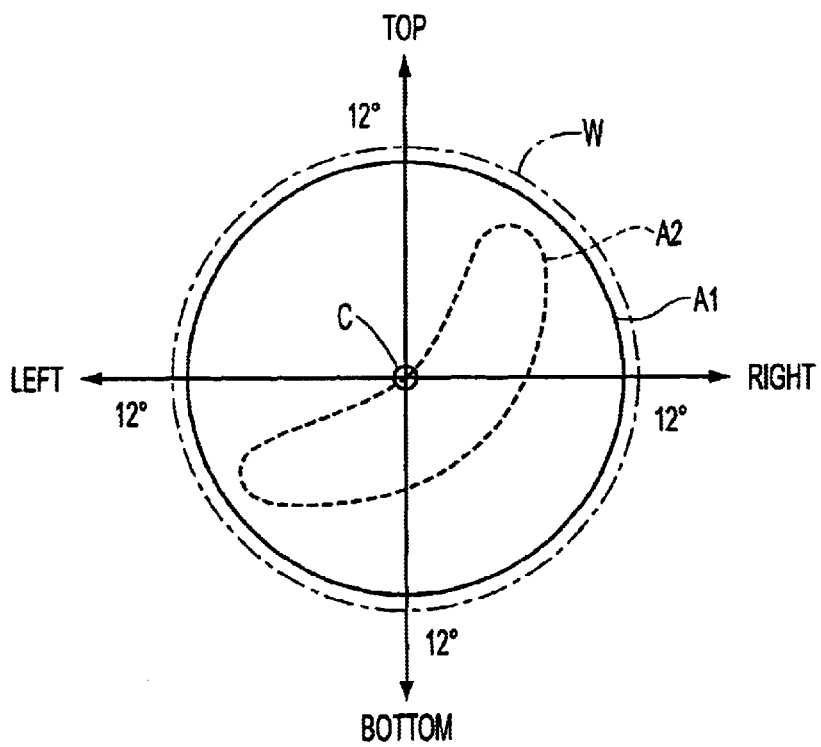
FIG. 6 is a conceptual diagram showing incidence angle dependency of contrast of image light formed on the light emission surface of the liquid crystal light valve 300R.

FIG. 6 is a conceptual diagram showing incidence angle dependency of contrast of image light formed on the light emission surface of the liquid crystal light valve 300R. In FIG. 6, the area A1 shown by the solid line shows an example of an angular range of good contrast of the image light when the liquid crystal light valve 300R of this embodiment is used. The area A2 shown by the broken lines shows an example of an angular range of good contrast of the image light when the conventional liquid crystal light valve including no compensating film is used. In the figure, the origin c corresponds to a case where light incident on the liquid crystal light valve 300R from the direction of normal line (incidence angle: 0 degree) is observed. In addition, each of the vertical and horizontal points corresponds to a case where light incident on the liquid crystal light valve 300R from a direction inclined at a predetermined angle from the direction of normal line is observed, and a point on the circle W shown by one-dot chain line corresponds to a case where light incident on the liquid crystal light valve from a direction inclined 12° from the direction of normal line is observed (incidence angle: 12 degrees).

As shown in the area A2, according to the conventional liquid crystal light valve including no compensating film, the contrast of the image light has incidence angle dependency. More specifically, as regards the light incident on the liquid crystal light valve in the lower right direction, the contrast of the image light is relatively good, and the contrast of the image light is not so good as regards the light incident in the upper left direction.

On the other hand, as shown in the area A1, according to the liquid crystal light valve 300R of this embodiment including the compensating films 305Ri and 305Ro, the angular range of good contrast shows a symmetry between the upper and lower halves and between the left and right halves, and good contrast can be obtained in a wide range. Therefore, even if light is incident on the liquid crystal light valve 300R from every direction, contrast of the image light is good. That is, since incidence angle dependency of contrast can be reduced, it is possible to increase contrast of the projected and displayed image.

In a projector displaying a color image, if an incidence angle of light incident on a liquid crystal light valve differs in a plane, color non-uniformity occurs on a projected and displayed image. In such a case, if the projector of the present invention is used, there is a possibility that contrast of the projected and displayed image can be increased, and the color non-uniformity can be reduced.

As described above, in the projector of this embodiment, the liquid crystal light valve includes the first compensating film disposed between the liquid crystal panel and the first polarizer, and the second compensating film disposed between the liquid crystal panel and the second polarizer. If such a liquid crystal light valve is used, it is possible to reduce incidence angle dependency of contrast of image light formed on the light emission surface of the liquid crystal light valve. Consequently, it is possible to increase contrast of an image projected and displayed by the projection lens.

While the projector 1000 for displaying a color image is described in the above embodiment, similar effects apply to a projector for displaying a monochrome image.

Figure 7:
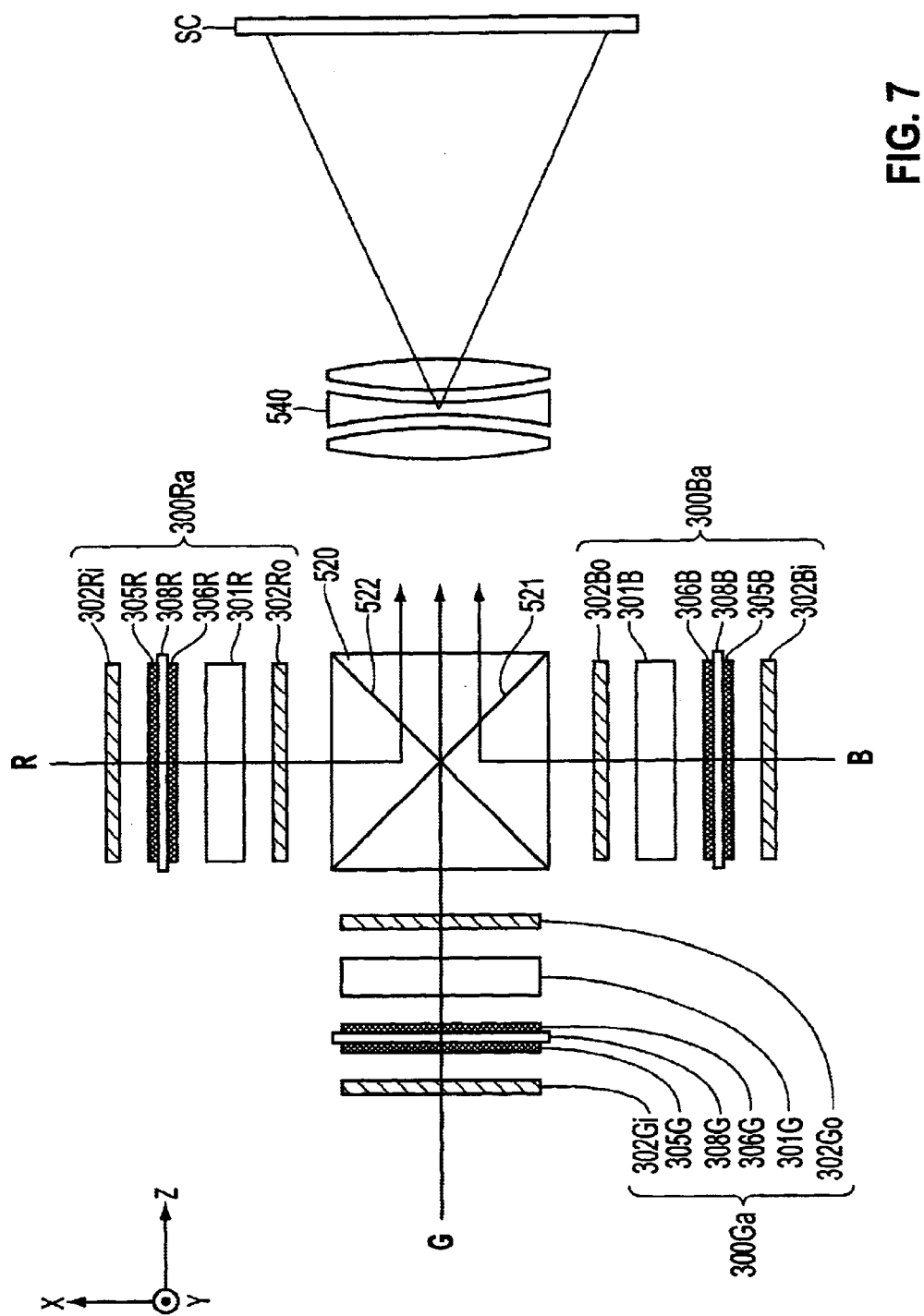
FIG. 7 is a an enlarged illustration showing three liquid crystal light valves 300Ra, 300Ga, and 300Ba in the second embodiment.

FIG. 7 is an enlarged illustration showing the three liquid crystal light valves 300Ra, 300Ga, and 300Ba in the second embodiment.

The first liquid crystal light valve 300Ra includes a liquid crystal panel 301R, first and second polarizers 302Ri and 302Ro, and first and second compensating films 305R and 306R as well as the first embodiment (FIG. 4). However, either of the first and second compensating films 305R and 306R are disposed between the liquid crystal panel 301R and the first polarizer 302Ri, unlike the first embodiment. Further, the two compensating films 305R and 306R are bonded to the glass plate 308R. The isotropic substance is preferably used for the glass plate 308R, because of preventing the effect on the polarization state of the light incident on the first polarizer 302Ri.

The two compensating film 305R and 306R may be bonded to the first polarizer 302Ri and the liquid crystal panel 301R, respectively. Such the construction has an advantage because the glass plate 308 is able to be omitted. On the other hand, when cooling efficiency of the compensating films 305R and 306R is considered, however, the first and second compensating films 305R and 306R may preferably be provided apart from the liquid crystal panel 301R and the polarizers 302Ri.

The second and third liquid crystal light valves 300G and 300B are configured in a manner similar to that of the first liquid crystal light valve 300R.

As described above, in the projector of the second embodiment, the liquid crystal light valve includes the two compensating films disposed between the liquid crystal panel and the first polarizer. If such a liquid crystal light valve is used, it is possible to reduce incidence angle dependency of contrast of image light formed on the light emission surface of the liquid crystal light valve, as well as the first embodiment. Consequently, it is possible to increase contrast of an image projected and displayed by the projection lens.

In the liquid crystal light valve of the second embodiment, the two compensating films are disposed between the liquid crystal panel and the first polarizer, however, the two compensating films may be disposed between the liquid crystal panel and the second polarizer. Such the construction is possible to have the same advantage. In other words, the two compensating films may be disposed between the liquid crystal panel and the first polarizer or between the liquid crystal panel and the second polarizer.

The present invention is not limited to the above-described embodiment and a mode for carrying out the invention, and can be carried out in various forms without departing from the sprit and scope of the invention. For example, the following modifications can be made.

(1) While a so-called integrator system is used as the illuminating system 100, as shown in FIG. 2, in the above-described embodiment, the illuminating system 100 is not limited thereto. For example, the illuminating system may be configured only by the light source device 120 for emitting a nearly parallel light. In this case, unlike a case where the integrator system is used, light does not enter on one point on a light valve from various directions. However, it is almost impossible to obtain light in one direction from a light source device, and various optical elements, such as lenses or mirrors, are disposed between the light source device and a liquid crystal light valve in a projector. Therefore, it is very difficult to adjust the angles of light incident on the liquid crystal light valves in one direction.

Therefore, even in the projector that does not use the integrator system, contrast of a projected image can be increased by reducing incidence angle dependency of contrast.

(2) While the compensating plate including a polymer layer in which the angle of inclination of the optical axis varies in the direction of the thickness is used in the above-described embodiment, there is a possibility that incidence angle dependency of contrast can be improved even if a compensating plate including a polymer layer in which the angle of inclination of the optical axis does not vary in the direction of the thickness is used. A liquid crystal layer of a liquid crystal panel, however, takes a complicated structure in which the inclination of liquid crystal molecules varies in the direction of the thickness when the ON-drive voltage is applied thereto. Unless the inclination of the liquid crystal molecules is constant, light enters each of the liquid crystal molecules from different directions. This means that leakage of light occurs in black display when a liquid crystal light valve in a normally white mode, that represents black in a state of application of the ON-drive voltage, is used. Therefore, according to the compensating plate including a polymer layer in which the angle of inclination of the axis does not vary, the complicated inclination of the liquid crystal molecules cannot be completely canceled, and there is a possibility that increasing effects of contrast is reduced. On the other hand, if the compensating plate including a polymer layer in which the angle of inclination of the optical axis varies in the direction of the thickness is used, it is possible to cancel the influence of complicated inclination of the liquid crystal molecules, whereby symmetrical and good contrast can be obtained.

(3) While the lens array 140 is used as a light dividing element for dividing a light emitted from the light source device into a plurality of partial light in the above-described embodiment, it is possible to use a rod-like light guide in place of the lens array 140. As the rod-like light guide, for example, a quadrangular cross-section glass rod or a hollow rod formed by a combination of four mirrors may be used. Even in the case of using such a rod-like light guide, a plurality of pseudo light sources are produced as in the case of using the lens array 140, so that the use of the present invention is highly effective.

(4) While the illuminating system 100 includes, as shown in FIG. 2, the polarized-light generating system 160 in the above-described embodiment, the polarized-light generating system may be omitted. In this case, since the first polarizers 302R$i$, 302G$i$, and 302B$i$ are also provided on the side of the light incidence surfaces of the liquid crystal light valves, as shown in FIG. 4, it is possible to enter the light in the same polarization direction into the first compensating films 305R$i$, 305G$i$, and 305B$i$. Therefore, also in this case, incidence angle dependency of contrast can be reduced, and contrast of a projected and displayed image can be increased.

What is claimed is:

1. A projector, comprising:
   an illuminating system that emits illumination light;
   a liquid crystal light valve that modulates light from the illuminating system according to image information; and
   a projection system that projects image light formed on a light emission surface of the liquid crystal light valve;
   wherein the illumination system includes:
      a light source device that emits a nearly parallel light;
      a light dividing element that divides the light emitted from the light source device into a plurality of partial light; and
      a superimposing lens that superimposes and illuminates the plurality of partial light emitted from the light dividing element on a light incidence surface of the liquid crystal light valve;
   wherein the liquid crystal light valve includes:
      a liquid crystal panel;
      a first polarizer located on a side of the light incidence surface of the liquid crystal panel;
      a second polarizer located on a side of the light emission surface of the liquid crystal panel;
      a first optical compensating plate that reduces a change of the contrast dependent on an angle of the illumination light emitted from the illumination optical system and applied onto the liquid crystal light valve from various directions, the first optical compensating plate being located between the liquid crystal panel and the first polarizer; and
      a second optical compensating plate that reduces a change of the contrast dependent on an angle of the illumination light emitted from the illumination optical system and applied onto the liquid crystal light valve from various directions, the second optical compensating plate being located between the liquid crystal panel and the second polarizer.

2. A projector as claimed in claim 1, wherein the liquid crystal panel is in a TN mode.

3. A projector as claimed in claim 1 further comprising a circuit board that supplies signal to the liquid crystal panel.

4. A projector as claimed in claim 1 further comprising a power source that supplies electric power to the liquid crystal panel.

5. A projector as claimed in claim 1, wherein the compensating plate includes a polymer layer in which the angle of inclination of an optical axis varies in the direction of the thickness.

6. A projector, comprising:
   an illuminating system that emits illumination light;
   a color separation system that separates the illumination light emitted from the illumination system into first to third color lights having three color components;
   first to third liquid crystal light valves that respectively modulate the first to third color lights separated by the color separation system according to image information;
   a color synthesizing section that synthesizes image lights formed on light emission surfaces of the first to third liquid crystal valves; and
   a projection system that projects synthesized light emitted from the color synthesizing section;
   wherein the illumination system includes:
      a light source device that emits a nearly parallel light;
      a light dividing element that divides the light emitted from the light source device into a plurality of partial light; and
      a superimposing lens that superimposes and illuminates the plurality of partial light emitted from the light dividing element on a light incidence surface of the liquid crystal light valve;
   and wherein each of the first to third liquid crystal light valves includes:
      a liquid crystal panel;
      a first polarizer located on a side of the light incidence surface of the liquid crystal panel;
      a second polarizer located on a side of the light emission surface of the liquid crystal panel;
      a first optical compensating plate that reduces a change of the contrast dependent on an angle of the illumination light emitted from the illumination optical system and applied onto the liquid crystal light valve from various directions, the first optical compensating plate being located between the liquid crystal panel and the first polarizer; and a second optical compensating plate that reduces a change of the contrast dependent on an angle of the illumination light emitted from the illumination optical system and applied onto the liquid crystal light valve from various directions, the second optical compensating plate being located between the liquid crystal panel and the second polarizer.

7. A projector as claimed in claim 6, wherein the liquid crystal panel is in a TN mode.

8. A projector as claimed in claim 6 further comprising a circuit board that supplies signals to the liquid crystal panel.

9. A projector as claimed in claim 6 further comprising a power source that supplies electric power to the liquid crystal panel.

10. A projector as claimed in claim 6, wherein the compensating plate includes a polymer layer in which the angle of inclination of an optical axis varies in the direction of the thickness.

11. A projector, comprising:

an illuminating system that emits illumination light;

a liquid crystal light valve that modulates light from the illuminating system according to image information; and a projection system that projects image light formed on a light emission surface of the liquid crystal light valve;

wherein the illumination system includes:
 a light source device that emits a nearly parallel light;
 a light dividing element that divides the light emitted from the light source device into a plurality of partial light; and
 a superimposing lens that superimposes and illuminates the plurality of partial light emitted from the light dividing element on a light incidence surface of the liquid crystal light valve;

and wherein the liquid crystal light valve includes:
 a liquid crystal panel;
 a first polarizer located on a side of the light incidence surface of the liquid crystal panel;
 a second polarizer located on a side of the light emission surface of the liquid crystal panel; and
 first and second optical compensating plates that reduce a change of the contrast dependent on an angle of the illumination light emitted from the illumination optical system and applied onto the liquid crystal light valve from various directions, the first and second optical compensating plates being located between the liquid crystal panel and the first polarizer or between the liquid crystal panel and the second polarizer.

12. A projector as claimed in claim 11, wherein the liquid crystal panel is in a TN mode.

13. A projector as claimed in claim 11 further comprising a circuit board that supplies signals to the liquid crystal panel.

14. A projector as claimed in claim 11 further comprising a power source that supplies electric power to the liquid crystal panel.

15. A projector as claimed in claim 11, wherein the compensating plate includes a polymer layer in which the angle of inclination of an optical axis varies in the direction of the thickness.

16. A projector, comprising:

an illuminating system that emits illumination light;

a color separation system that separates the illumination light emitted from the illumination system into first to third color lights having three color components;

first to third liquid crystal light valves that respectively modulate first to third color lights separated by the color separation system according to image information;

a color synthesizing section that synthesizes image lights formed on light emission surfaces of the first to third liquid crystal valves; and a projection system that projects synthesized light emitted from the color synthesizing section;

wherein the illumination system includes:
 a light source device that emits a nearly parallel light;
 a light dividing element that divides the light emitted from the light source device into a plurality of partial light; and
 a superimposing lens that superimposes and illuminates the plurality of partial light emitted from the light dividing element on a light incidence surface of the liquid crystal light valve;

and wherein each of the first to third liquid crystal light valves includes:
 a liquid crystal panel;
 a first polarizer located on a side of the light incidence surface of the liquid crystal panel;
 a second polarizer located on a side of the light emission surface of the liquid crystal panel; and
 first and second optical compensating plates that reduce a change of the contrast dependent on an angle of the illumination light emitted from the illumination optical system and applied onto the liquid crystal light valve from various directions, the first and second optical compensating plates being located between the liquid crystal panel and the first polarizer or between the liquid crystal panel and the second polarizer.

17. A projector as claimed in claim 16, wherein the liquid crystal panel is in a TN mode.

18. A projector as claimed in claim 16 further comprising a circuit board that supplies signals to the liquid crystal panel.

19. A projector as claimed in claim 16 further comprising a power source that supplies electric power to the liquid crystal panel.

20. A projector as claimed in claim 16, wherein the compensating plate includes a polymer layer in which the angle of inclination of an optical axis varies in the direction of the thickness.

21. A projector, comprising:

an illuminating system that emits illumination light;

a liquid crystal light valve that modulates light from the illuminating system according to image information; and a projection system for that projects image light formed on a light emission surface of the liquid crystal light valve;

wherein the liquid crystal light valve includes:
 a liquid crystal panel;
 a first polarizer located on a side of a light incidence surface of the liquid crystal panel;
 a second polarizer located on a side of the light emission surface of the liquid crystal panel;

a first optical compensating plate located between the liquid crystal panel and the first polarizer;

a second optical compensating plate located between the liquid crystal panel and the second polarizer;

a first light-transmissive member bonded to the first optical compensating plate, the first light-transmissive member is located separately from the liquid crystal panel and the first polarizer; and a second light-transmissive member bonded to the second optical compensating plate, the second light-transmissive member is located separately from the liquid crystal panel and the second polarizer.

22. A projector as claimed in claim 21, wherein the illuminating system includes:

a light source device that emits a nearly parallel light;

a light dividing element that divides the light emitted from the light source device into a plurality of partial light; and a superimposing lens that superimposes the plurality of partial light emitted from the light dividing element on the light incidence surface of the liquid crystal light valve.

23. A projector as claimed in claim 21, wherein the liquid crystal panel is in a TN mode.

24. A projector as claimed in claim 21, wherein the compensating plate includes a polymer layer in which the angle of inclination of an optical axis varies in the direction of the thickness.

25. A projector as claimed in claim 21 further comprising a circuit board that supplies signals to the liquid crystal panel.

26. A projector as claimed in claim 21 further comprising a power source that supplies electric power to the liquid crystal panel.

27. A projector comprising:

an illuminating system that emits illumination light;

a color separation system that separates the illumination light emitted from the illumination system into first to third color lights having three color components;

first to third liquid crystal light valves that respectively modulate first to third color lights separated by the color separation system according to image information;

a color synthesizing section that synthesizes image lights formed on light emission surfaces of the first to third liquid crystal valves; and a projection system that projects synthesized light emitted from the color synthesizing section;

wherein each of the first to third liquid crystal light valves includes:

a liquid crystal panel;

a first polarizer located on a side of a light incidence surface of the liquid crystal panel;

a second polarizer located on a side of the light emission surface of the liquid crystal panel;

a first optical compensating plate located between the liquid crystal panel and the first polarizer;

a second optical compensating plate located between the liquid crystal panel and the second polarizer;

a first light-transmissive member bonded to the first optical compensating plate, the first light-transmissive member is located separately from the liquid crystal panel and the first polarizer; and a second light-transmissive member bonded to the second optical compensating plate, the second light-transmissive member is located separately from the liquid crystal panel and the second polarizer.

28. A projector as claimed in claim 27, wherein the illuminating system includes:

a light source device that emits a nearly parallel light;

a light dividing element that divides the light emitted from the light source device into a plurality of partial light; and a superimposing lens that superimposes the plurality of partial light emitted from the light dividing element on the light incidence surface of the liquid crystal light valve.

29. A projector as claimed in claim 27, wherein the liquid crystal panel is in a TN mode.

30. A projector as claimed in claim 27, wherein the compensating plate includes a polymer layer in which the angle of inclination of an optical axis varies in the direction of the thickness.

31. A projector as claimed in claim 27 further comprising a circuit board that supplies signals to the liquid crystal panel.

32. A projector as claimed in claim 27 further comprising a power source that supplies electric power to the liquid crystal panel.

33. A projector, comprising:

an illuminating system that emits illumination light;

a liquid crystal light valve that modulates light from the illuminating system according to image information; and a projection system for that projects image light formed on a light emission surface of the liquid crystal light valve;

wherein the liquid crystal light valve includes:

a liquid crystal panel;

a first polarizer located on a side of a light incidence surface of the liquid crystal panel;

a second polarizer located on a side of the light emission surface of the liquid crystal panel;

a first and second optical compensating plates located between the liquid crystal panel and the first polarizer or between the liquid crystal panel and the second polarizer;

a first light-transmissive member bonded to the first optical compensating plate, the first light-transmissive member is located separately from the liquid crystal panel, the first polarizer and the second polarizer; and a second light-transmissive member bonded to the second optical compensating plate, the second light-transmissive member is located separately from the liquid crystal panel, the first polarizer and the second polarizer.

34. A projector as claimed in claim 33, wherein the illuminating system includes:

a light source device that emits a nearly parallel light;

a light dividing element that divides the light emitted from the light source device into a plurality of partial light; and a superimposing lens that superimposes the plurality of partial light emitted from the light dividing element on the light incidence surface of the liquid crystal light valve.

35. A projector as claimed in claim 33, wherein the liquid crystal panel is in a TN mode.

36. A projector as claimed in claim 33, wherein the compensating plate includes a polymer layer in which the angle of inclination of an optical axis varies in the direction of the thickness.

37. A projector as claimed in claim 33 further comprising a circuit board that supplies signals to the liquid crystal panel.

38. A projector as claimed in claim 33 further comprising a power source that supplies electric power to the liquid crystal panel.

39. A projector, comprising:

an illuminating system that emits illumination light;

a color separation system that separates the illumination light emitted from the illumination system into first to third color lights having three color components;

first to third liquid crystal light valve that respectively modulate the first to third color lights separated by the color separation system according to image information;

a color synthesizing section that synthesizes image lights formed on light emission surfaces of the first to third liquid crystal valves; and a projection system that projects synthesized light emitted from the color synthesizing section;

wherein each of the first to third liquid crystal light valves includes:

a liquid crystal panel;

a first polarizer located on a side of a light incidence surface of the liquid crystal panel;

a second polarizer located on a side of the light emission surface of the liquid crystal panel;

a first and second optical compensating plates located between the liquid crystal panel and the first polarizer or between the liquid crystal panel and the second polarizer;

a first light-transmissive member bonded to the first optical compensating plate, the first light-transmissive member is located separately from the liquid crystal panel, the first polarized and the second polarized; and a second light-transmissive member bonded to the second optical compensating plate, the second light-transmissive member is located separately from the liquid crystal panel, the first polarizer and the second polarizer.

40. A projector as claimed in claim 39, wherein the illuminating system includes:

a light source device that emits a nearly parallel light;

a light dividing element that divides the light emitted from the light source device into a plurality of partial light; and a superimposing lens that superimposes the plurality of partial light emitted from the light dividing element on the light incidence surface of the liquid crystal light valve.

41. A projector as claimed in claim 39, wherein the liquid crystal panel is in a TN mode.

42. A projector as claimed in claim 39, wherein the compensating plate includes a polymer layer in which the angle of inclination of an optical axis varies in the direction of the thickness.

43. A projector as claimed in claim 39 further comprising a circuit board that supplies signals to the liquid crystal panel.

44. A projector as claimed in claim 39 further comprising a power source that supplies electric power to the liquid crystal panel.

\* \* \* \* \*